US010712857B2

(12) United States Patent
Yuan

(10) Patent No.: US 10,712,857 B2
(45) Date of Patent: Jul. 14, 2020

(54) THIN SCREEN FRAME TABLET DEVICE

(75) Inventor: Kaining Yuan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 13/977,028

(22) PCT Filed: Jun. 28, 2012

(86) PCT No.: PCT/CN2012/077701
§ 371 (c)(1),
(2), (4) Date: Jul. 21, 2014

(87) PCT Pub. No.: WO2014/000203
PCT Pub. Date: Jan. 3, 2014

(65) Prior Publication Data
US 2015/0309642 A1    Oct. 29, 2015

(51) Int. Cl.
*G06F 3/01* (2006.01)
*G06F 3/041* (2006.01)
*G06F 3/0488* (2013.01)

(52) U.S. Cl.
CPC ............ *G06F 3/0416* (2013.01); *G06F 3/041* (2013.01); *G06F 3/04886* (2013.01); *G06F 2203/04104* (2013.01); *G06F 2203/04804* (2013.01)

(58) Field of Classification Search
CPC ......... G06F 3/0416; G06F 2203/04104; G06F 3/044; G06F 3/017; G06F 2200/1636
USPC .................................................. 345/173–178
See application file for complete search history.

(56) References Cited

U.S. PATENT DOCUMENTS

| 2009/0066663 | A1 | 3/2009 | Chang et al. |
| 2009/0256809 | A1 | 10/2009 | Minor |
| 2010/0103136 | A1 | 4/2010 | Ono et al. |
| 2010/0164904 | A1 | 7/2010 | Kim et al. |
| 2011/0163986 | A1 | 7/2011 | Lee et al. |
| 2011/0187647 | A1 | 8/2011 | Woloszynski et al. |
| 2011/0261058 | A1* | 10/2011 | Luo ...................... G06F 1/1626 345/441 |
| 2012/0086658 | A1* | 4/2012 | Moradian ............. G06F 1/1641 345/173 |
| 2012/0256963 | A1* | 10/2012 | Suzuki ................ G06F 3/04883 345/661 |

(Continued)

FOREIGN PATENT DOCUMENTS

| CN | 1704885 A | 12/2005 |
| CN | 102339205 A | 2/2012 |
| CN | 102439547 A | 5/2012 |

OTHER PUBLICATIONS

International Search Report and Written Opinion received for PCT application No. PCT/CN2012/077701, dated Apr. 4, 2013, 11 pages.

(Continued)

*Primary Examiner* — Dennis P Joseph
(74) *Attorney, Agent, or Firm* — Jordan IP Law, LLC

(57) ABSTRACT

Systems and methods may provide for identifying a back touch event with respect to a back of a device, and identifying a front touch event with respect to a front of the device. Additionally, the front touch event may be associated with either a user grasp of the device or a user request based at least in part on the back touch event. In one example, the device is a smart tablet having a thin screen frame with limited grasping area.

24 Claims, 4 Drawing Sheets

(56) References Cited

U.S. PATENT DOCUMENTS

2013/0076644 A1* 3/2013 Escobedo ............. G06F 3/0488
345/173
2013/0187894 A1* 7/2013 Ladouceur ............ G06F 3/0488
345/176
2013/0234929 A1* 9/2013 Libin ....................... G06F 3/01
345/156

OTHER PUBLICATIONS

Office Action for Chinese Patent Application No. 201280073531.2, dated Jun. 20, 2016, 15 pages with 9 pages of English Translation.
Office Action for Chinese Patent Application No. 201280073531.2, dated Jun. 20, 2016, 13 pages of English Translation.
Office Action for Chinese Patent Application No. 201280073531.2, dated Mar. 2, 2017, 13 pages of English Translation.

\* cited by examiner

THIN SCREEN FRAME TABLET DEVICE

BACKGROUND

Technical Field

Embodiments generally relate to the handling of mobile devices. More particularly, embodiments relate to a hardware based approach to identifying user grasps of touch screen mobile devices.

Discussion

Smart tablet devices may be equipped with a touch screen display that enables the user to interact with the device. Grasping the device (e.g., picking it up), however, can cause unintended interactions with the screen due to the user's thumb contacting the touch screen. While one solution may be to increase the width of the enclosure frame around the touch screen, such an approach may reduce the viewing area. Another solution may be to use "grip suppression" software to identify and suppress unintended touch screen interactions. Grip suppression software, however, can be ineffective. Moreover, compatibility between the grip suppression software and the other applications running on the tablet device may present difficulties, particularly as the other applications are upgraded and new applications are installed on the device.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a method of operating a mobile device in which a back touch event is identified with respect to a back of the device. The method may also provide for identifying a front touch event with respect to a front of the device, wherein the front touch event is associated with either a user grasp or a user request based at least in part on the back touch event.

Embodiments may also include a non-transitory computer readable storage medium having a set of instructions which, if executed by a processor, cause a mobile device to identify a back touch event with respect to a back of the device. The instructions, if executed, can also cause the mobile device to identify a front touch event with respect to a front of the device, and associate the front touch event with either a user grasp or a user request based at least in part on the back touch event.

Additionally, embodiments can include a mobile device having a back touch sensor disposed on a back of the device, and a front touch screen disposed on a front of the device. The mobile device may also include an enclosure having a frame with edges to expose the front touch screen. The mobile device may also have a back logic module to use the back touch sensor to identify a back touch event with respect to the back of the device, and a front logic module to use the front touch screen to identify a front touch event with respect to the front of the device. In addition, the mobile device can have a classification logic module to associate the front touch event with either a user grasp or a user request based at least in part on the back touch event.

Figure 1:
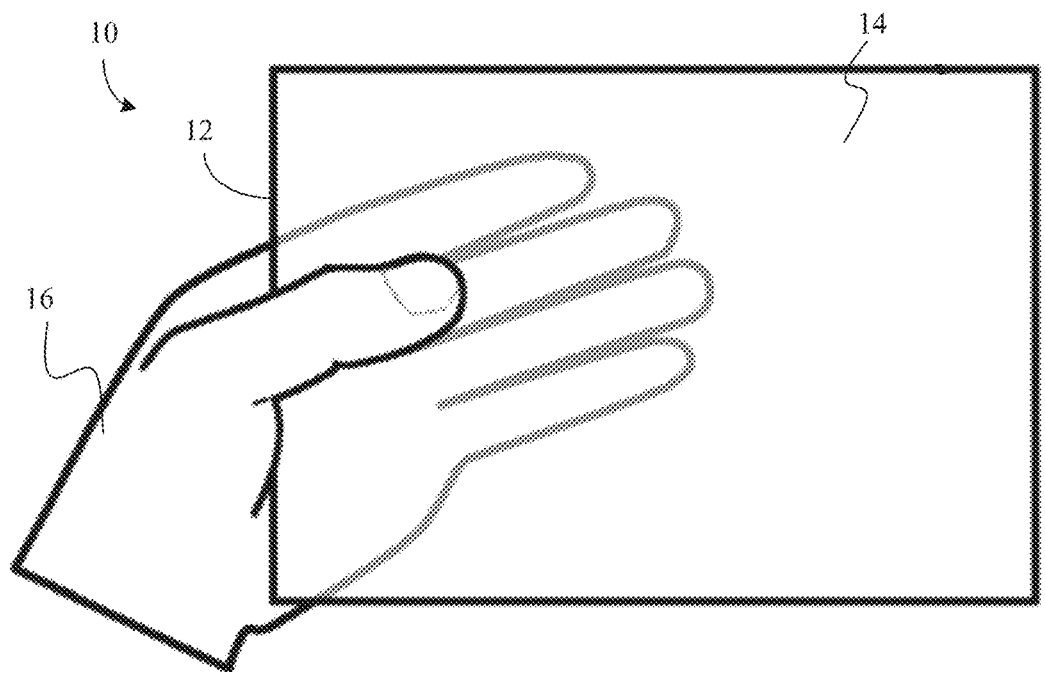
FIG. 1 is a block diagram of an example of a mobile device having a thin frame according to an embodiment.

Turning now to FIG. 1, a mobile device 10 is shown, wherein the enclosure of the mobile device 10 has a relatively thin frame 12 with inner edges that expose (e.g., define an opening for) a front touch screen 14 of the mobile device 10. While the thinness of the frame 12 enables the viewing area of the touch panel 14 to be enlarged, a user's hand 16 may be likely to contact the touch panel 14 even when the user does not intend to interact with the touch panel 14 (e.g., user grasp instead of user request). As will be discussed in greater detail below, the mobile device 10 may use a back touch sensor (not shown) to provide a hardware based solution to identifying user grasps.

Figure 2:
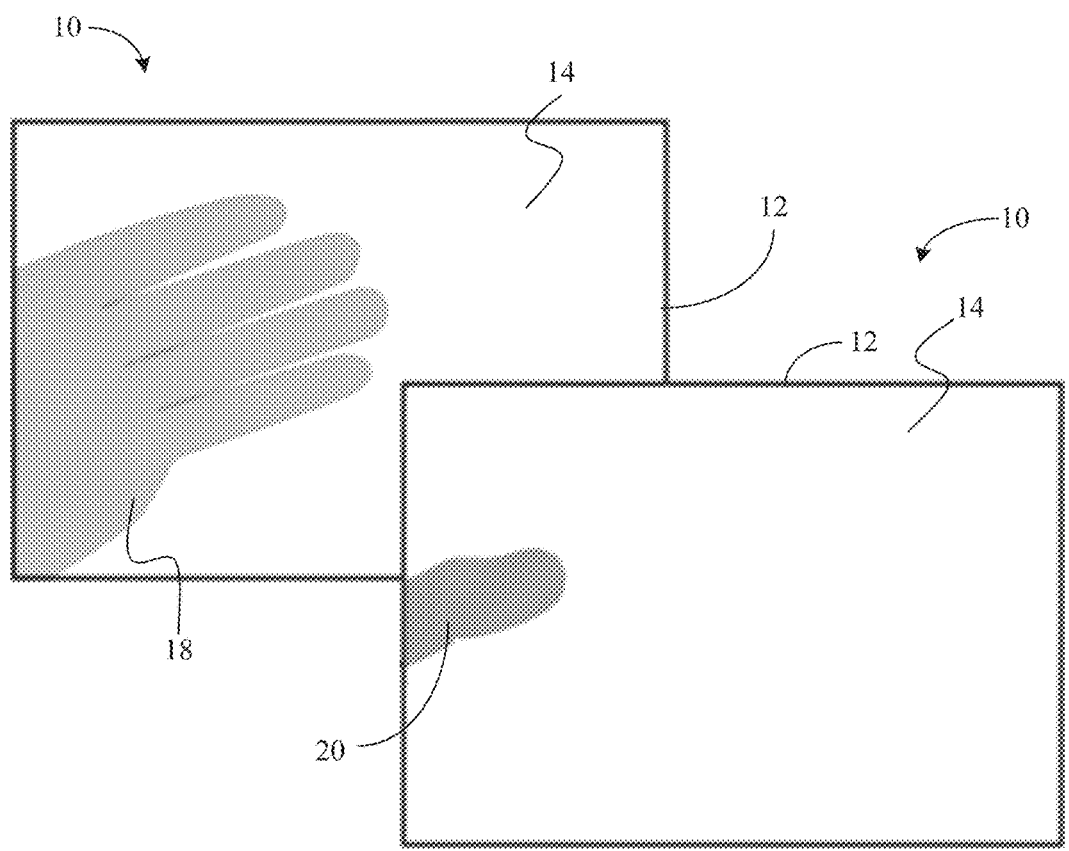
FIG. 2 is a block diagram of an example of a set of user prompts on a front touch screen according to an embodiment.

FIG. 2 shows an example of a set of user prompts that may be used to identify user grasps. In general, if a back touch event is identified with respect to the back of the mobile device 10, a target grasp area 18 may be displayed via the front touch screen 14. In the illustrated example, the target grasp area 18 shows a finger outline of the back touch event, although other shapes may be used. The target grasp area 18 can therefore notify the user that a potential user grasp has been detected and inform the user of where to place his or her thumb in order to handle the mobile device 10 without that handling to be interpreted as a user request/interaction. Thus, if the user places his or her thumb within the target grasp area 18, that action can be detected as a front touch event associated with a user grasp rather than a user request. Accordingly, the front touch event may be withheld from one or more applications on the device 10. Also in response to such a front touch event, another grasp confirmation 20 may be displayed on the front touch screen 14, wherein the grasp confirmation 20 may confirm to the user that the current handling of the mobile device 10 is being treated as a user grasp, in the illustrated example, the grasp confirmation 20 corresponds to a thumb outline of the front touch event.

If, however, either the front touch event is outside the target grasp area 18 or the front touch event is not an initial touch event relative to the back touch event (e.g., the user touches another area before touching the target grasp area), the front touch event may be associated with a user request and provided to one or more applications on the mobile device 10.

Figure 3:
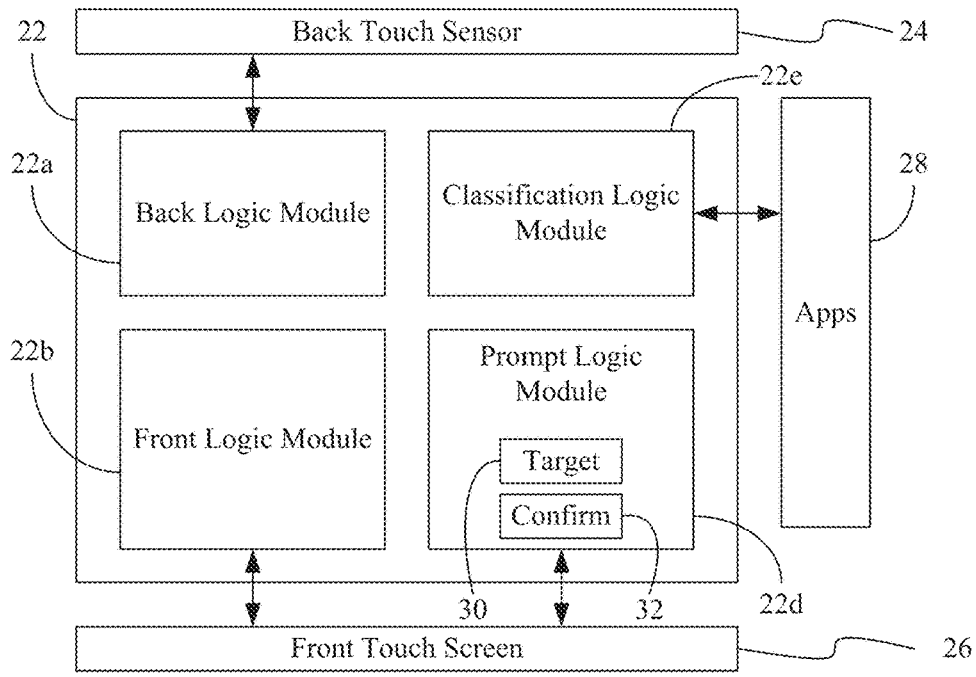
FIG. 3 is a block diagram of an example of a logic architecture according to an embodiment.

Turning now to FIG. 3, a logic architecture 22 is shown in which a back touch sensor 24 and a front touch screen 26 may be used to determine whether a user is grasping a mobile device such as the mobile device 10 (FIGS. 1 and 2) or interacting with the mobile device. In the illustrated example, a back logic module 22a may use the back touch sensor 24 to identify a back touch event with respect to the back of the device, wherein a prompt logic module 22d may have a target component 30 that displays a target grasp area via the front touch screen 26 in response to the back touch event. In addition, a front logic module 22b can be configured to identify a front touch event with respect to the front of the device. A classification module 22e may generally associate the front touch event with either a user grasp or a user request.

More particularly, the front touch event can be associated with (e.g., classified as) a user grasp of the device if the front touch event identifies a touch within the target grasp area and the touch event is an initial touch event relative to the back touch event. In such a case, a confirmation component 32 of the prompt logic module 22d may display a grasp confirmation on the front touch screen 26 to notify the user that the front touch event has been classified as a user grasp. Of particular note is that front touch events associated with user grasps may be withheld from one or more applications 28 running on the mobile device.

If, on the other hand, either the front touch event identifies a touch outside the target grasp area or the front touch event is not an initial touch event relative to the back touch event, the illustrated classification logic module 22e may provide the front touch event to one or more of the applications 28. The classification logic module 22e and the front logic module 22b may also coordinate in the detection and analysis of subsequent touch events, as will be discussed in greater detail. Thus, the illustrated applications 28 require no modification and have no grasp detection compatibility issues. Indeed, the applications 28 do not even need to be aware of the operability of the logic architecture 22 in conjunction with the touch panel hardware.

The back touch sensor 24 and front touch screen 26 may be configured differently to address concerns regarding cost and user experience. For example, the front touch screen 26 might include an ITO (indium tin oxide) panel disposed on top of an LCD (liquid crystal display) screen, wherein the panel has a relatively quick response, high resolution and precise measurement capability. The back touch sensor 24, on the other hand, could be a relatively low cost, low resolution and imprecise panel such as a film printed circuit board with many copper capacitive touch points. The back touch sensor 24 may also be configured to detect touch events through device covers such as rubber or plastic protective covers.

Figure 4:
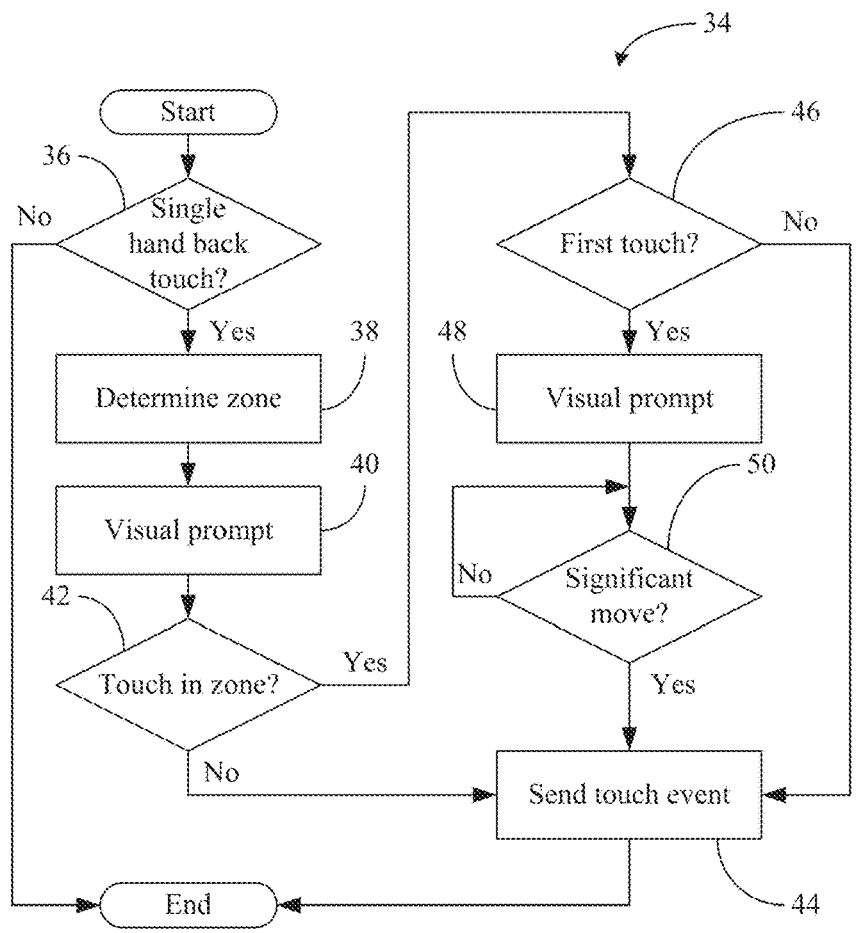
FIG. 4 is a flowchart of an example of a method of operating a mobile device according to an embodiment.

FIG. 4 shows a method 34 of operating a mobile device. The method 34 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Figure 5:
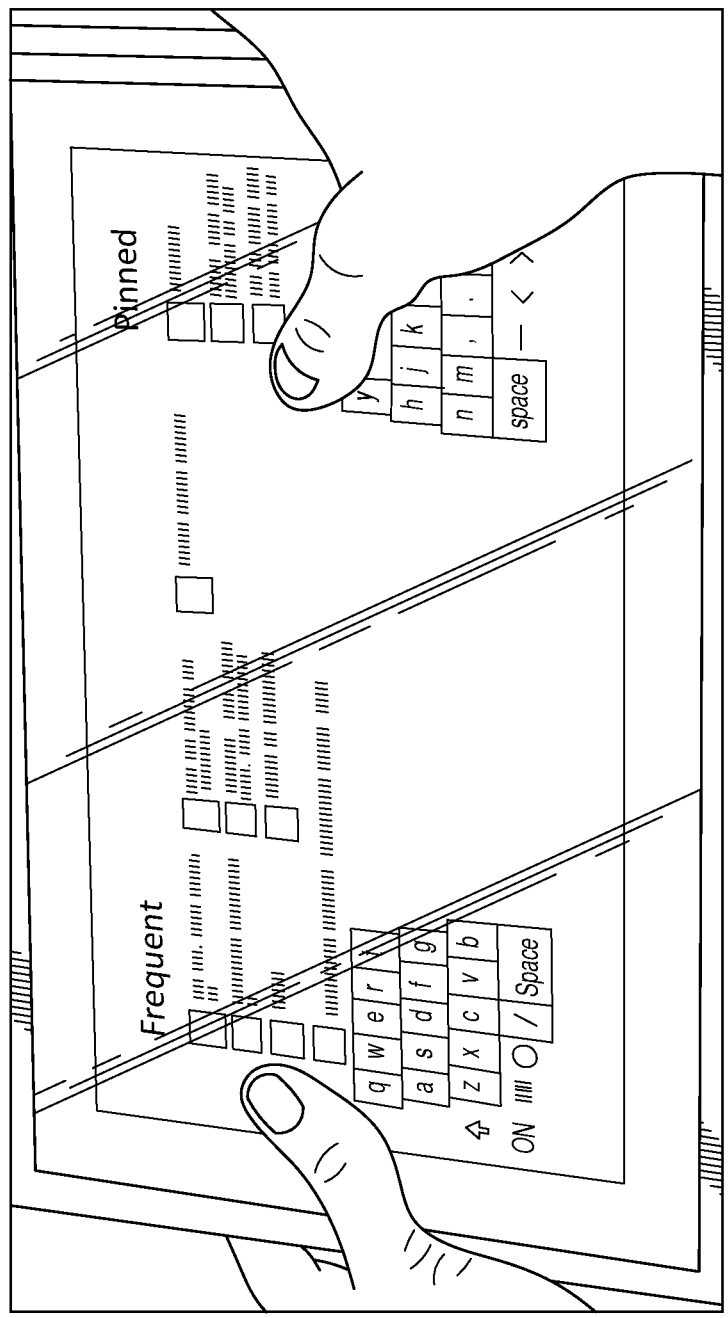
FIG. 5 is an illustration of an example of a dual hand back touch event.

Illustrated processing block 36 provides for determining whether a single hand back touch event has occurred. In this regard, FIG. 5 shows a dual hand back touch scenario in which the user cradles the device in both hands. Such an event would not trigger a positive determination at block 36 (FIG. 4) in the illustrated example. Returning now to FIG. 4, if it is determined at block 36 that the back touch event corresponds to a single hand, a target grasp area/zone may be determined at block 38, wherein a visual prompt of the target grasp area can be displayed via a front touch screen of the mobile device at block 40. If it is determined at block 42 that a front touch event has occurred outside the target grasp area, illustrated block 44 associates the front touch event with a user request and sends the touch event to one or more applications on the device. If, however, the front touch event indicates a touch within the target grasp area, a determination at block 46 may be made as to whether the front touch event is an initial touch event relative to the back touch event. If not, the front touch event may be sent to one or more applications on the device at block 44. Otherwise, a visual prompt of a grasp confirmation can be displayed via the front touch screen at block 48.

Additionally, a determination may be made at block 50 as to whether significant touch movement has subsequently occurred with respect to the front touch screen 26. Such subsequent touch movement might be deemed "significant" if it exceeds a certain distance threshold and a speed threshold. For example, a finger "flick" across the front touch screen may qualify as a significant touch movement if it covers a great enough distance and occurs relatively quickly. If the subsequent touch movement is deemed significant, one or more touch events corresponding to the subsequent touch movement may be provided to one or more applications on the device at block 44.

Figure 6:
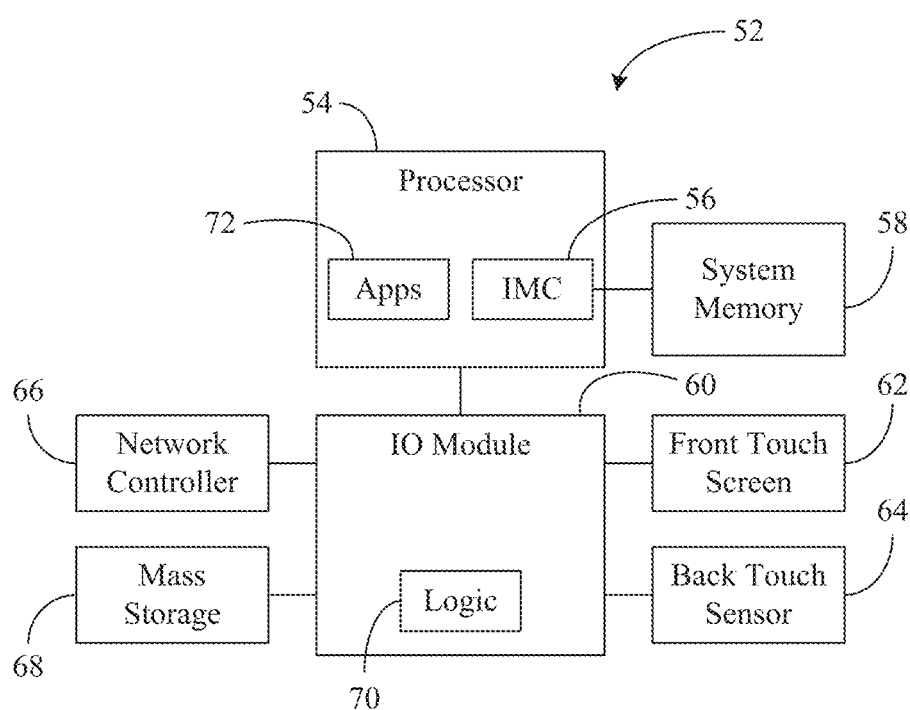
FIG. 6 is a block diagram of an example of a mobile device according to an embodiment.

Turning now to FIG. 6 a mobile device 52 is shown, wherein the device 52 may have computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). In the illustrated example, a processor 54 has an integrated memory controller (IMC) 56 that facilitates communication between the processor 54 and system memory 58, wherein the system memory 58 could include, for example, double data rate (DDR) synchronous dynamic random access memory (SDRAM, e.g., DDR3 SDRAM JEDEC Standard JESD79-3C, April 2008) modules. The modules of the system memory 58 may be incorporated into a single inline memory module (SIMM), dual inline memory module (DIMM), small outline DIMM (SODIMM), and so forth.

The illustrated device 52 also includes an IO module 60 that facilitates communication with a front touch screen 62, a back touch sensor 64, a network controller 66, mass storage 68, and various other controllers, busses and/or modules (not shown). The IO module 60 may also include a logic architecture 70 configured to use the back touch sensor 64 to identify a back touch event and use the front touch screen 62 to identify a front touch event, as already discussed. Moreover, the logic architecture 70 may associate the front touch event with either a user grasp or a user request based at least in part on the back touch event, wherein user grasps may be withheld from one or more applications 72 executing on the processor 54.

Although the illustrated logic architecture 70 is implemented in the IO module 60, the logic architecture 70 could also be implemented elsewhere in the mobile device 40. For example, the logic architecture 70 may also be implemented in the processor 54 or as a standalone logic block in a system on chip (SOC) configuration that includes the processor 54, IO module 60, network controller 66, etc., on a single chip. Other configurations may also be used depending upon the circumstances.

Techniques described herein may therefore enable larger screen sizes by reducing touch screen frame thicknesses without encountering difficulties with respect to unintended touch screen interactions. Additionally, techniques described herein may eliminate compatibility concerns with regard to applications that might be installed and/or upgraded on the device.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Moreover, any use of the terms "first", "second", etc., does not limit the embodiments discussed to the number of components listed.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A mobile device comprising:
a back touch sensor disposed on a back of the device;
a front touch screen disposed on a front of the device;
an enclosure including a frame having edges to expose the front touch screen;
a back logic module to use the back touch sensor to identify a back touch event with respect to the back of the device;
a front logic module to use the front touch screen to identify a front touch event with which one or more applications are to be controlled and with respect to the front of the device;
a classification logic module to associate the front touch event with either a user grasp or a user request based at least in part on the back touch event; and
a prompt logic module to display on the front touch screen a target grasp area located on the back of the device in response to the back touch event on the back of the device if the back touch event corresponds to a single hand, wherein the target grasp area is to be displayed on the front touch screen as an outline of the back touch event, and wherein the front touch event is to be associated with the user grasp and withheld from the one or more applications on the device if the front touch event lies within the displayed target grasp area and the front touch event is an initial touch event relative to the back touch event, wherein the back touch event is to be withheld from the one or more applications.

2. The device of claim 1, wherein the front touch event is to be associated with the user request and provided to one or more applications on the device if the front touch event is not an initial touch event relative to the back touch event.

3. The device of claim 1, wherein the target grasp area is to show a finger outline of the back touch event.

4. The device of claim 1, further including a prompt logic module to display a grasp confirmation on the front touch screen of the device if the front touch event is associated with the user grasp.

5. The device of claim 4, wherein the grasp confirmation is to show a thumb outline of the front touch event.

6. The device of claim 1, wherein the front logic module is to identify subsequent touch movement with respect to the front of the device, and the classification logic module is to associate the subsequent touch movement with either the user grasp or the user request.

7. The device of claim 6, wherein the subsequent touch movement is to be associated with the user request if the subsequent touch movement exceeds a distance threshold and a speed threshold.

8. The device of claim 1, wherein the back touch sensor has a resolution that is less than a resolution of the front touch screen.

9. A non-transitory computer readable storage medium comprising a set of instructions which, if executed by a processor, cause a device to:
identify a back touch event with respect to a back of the device;
identify a front touch event with which one or more applications are to be controlled and with respect to a front of the device;
associate the front touch event with either a user grasp or a user request based at least in part on the back touch event; and
display on a front touch screen of the device a target grasp area located on the back of the device in response to the back touch event on the back of the device if the back touch event corresponds to a single hand, wherein the target grasp area is displayed on the front touch screen as an outline of the back touch event, wherein the front touch event is to be associated with the user grasp and withheld from the one or more applications on the device if the front touch event lies within the displayed target grasp area and the front touch event is an initial touch event relative to the back touch event, and wherein the back touch event is to be withheld from the one or more applications.

10. The medium of claim 9, wherein the front touch event is to be associated with the user request and provided to one or more applications on the device if the front touch event is not an initial touch event relative to the back touch event.

11. The medium of claim 9, wherein the target grasp area is to show a finger outline of the back touch event.

12. The medium of claim 9, wherein the instructions, if executed, cause the device to display a grasp confirmation on a front touch screen of the device if the front touch event is associated with the user grasp.

13. The medium of claim 12, wherein the grasp confirmation is to show a thumb outline of the front touch event.

14. The medium of claim 9, wherein the instructions, if executed, cause the device to:
identify subsequent touch movement with respect to the front of the device; and
associate the subsequent touch movement with either the user grasp or the user request.

15. The medium of claim 14, wherein the subsequent touch movement is to be associated with the user request and provided to one or more applications on the device only if the subsequent touch movement exceeds a distance threshold and a speed threshold.

16. The medium of claim 9, wherein the instructions, if executed, cause the device to use a relatively low resolution touch sensor to identify the back touch event, and use a relatively high resolution touch screen to identify the front touch event.

17. A method comprising:
identifying a back touch event with respect to a back of a device;
identifying a front touch event with respect to a front of the device;
associating the front touch event with which one or more applications are controlled with either a user grasp or a user request based at least in part on the back touch event; and
displaying on a front touch screen of the device a target grasp area located on the back of the device in response to the back touch event on the back of the device if the back touch event corresponds to a single hand, wherein the target grasp area is displayed on the front touch screen as an outline of the back touch event,
wherein the front touch event is associated with the user grasp and withheld from the one or more applications on the device if the front touch event lies within the displayed target grasp area and the front touch event is an initial touch event relative to the back touch event, and wherein the back touch event is to be withheld from the one or more applications.

18. The method of claim 17, wherein the front touch event is associated with the user request and provided to one or more applications on the device if the front touch event is not an initial touch event relative to the back touch event.

19. The method of claim 17, wherein the target grasp area shows a finger outline of the back touch event.

20. The method of claim 17, further including displaying a grasp confirmation on a front touch screen of the device if the front touch event is associated with the user grasp.

21. The method of claim 20, wherein the grasp confirmation corresponds to a thumb outline of the front touch event.

22. The method of claim 17, further including:
identifying subsequent touch movement with respect to the front of the device; and
associating the subsequent touch movement with either the user grasp or the user request.

23. The method of claim 22, wherein the subsequent touch movement is associated with the user request and provided to one or more applications on the device only if the subsequent touch movement exceeds a distance threshold and a speed threshold.

24. The method of claim 17, further including using a relatively low resolution touch sensor to identify the back touch event and using a relatively high resolution touch screen to identify the front touch event.

* * * * *